(12) United States Patent
Brasnett et al.

(10) Patent No.: US 9,430,820 B2
(45) Date of Patent: Aug. 30, 2016

(54) PIXEL CLUSTERING

(71) Applicant: Imagination Technologies Limited, Kings Langley (GB)

(72) Inventors: Paul Brasnett, Kings Langley (GB); Jonathan Diggins, Chesham (GB)

(73) Assignee: Imagination Technologies Limited, Kings Langley (GB)

( * ) Notice: Subject to any disclaimer, the term of this patent is extended or adjusted under 35 U.S.C. 154(b) by 136 days.

(21) Appl. No.: 14/157,791

(22) Filed: Jan. 17, 2014

(65) Prior Publication Data

US 2014/0212066 A1    Jul. 31, 2014

(30) Foreign Application Priority Data

Jan. 31, 2013   (GB) .................................. 1301739.7

(51) Int. Cl.
*G06K 9/36* (2006.01)
*G06T 5/50* (2006.01)

(52) U.S. Cl.
CPC ....... *G06T 5/50* (2013.01); *G06T 2207/20221* (2013.01)

(58) Field of Classification Search
CPC ....................... G06T 5/50; G06T 2207/20221
USPC ................................ 382/133, 128, 284, 199
See application file for complete search history.

(56) References Cited

U.S. PATENT DOCUMENTS

| | | | | |
|---|---|---|---|---|
| 5,115,477 | A * | 5/1992 | Groezinger ........... | G06T 7/0083 382/199 |
| 5,808,735 | A * | 9/1998 | Lee .................... | G01N 21/9501 250/559.42 |
| 8,130,840 | B2 * | 3/2012 | Mishima ............... | G06T 3/4007 375/240.16 |
| 2006/0280352 | A1 * | 12/2006 | Muschler ............. | G06K 9/0014 382/133 |
| 2007/0286467 | A1 * | 12/2007 | Asano et al. .................. | 382/128 |
| 2008/0240241 | A1 * | 10/2008 | Mishima ............... | G06T 3/4007 375/240.15 |
| 2009/0244389 | A1 * | 10/2009 | Mishima ............... | G06T 3/4007 348/699 |
| 2010/0231995 | A1 * | 9/2010 | Tsunematsu ........... | H04N 1/644 358/530 |

* cited by examiner

*Primary Examiner* — Mekonen Bekele
(74) *Attorney, Agent, or Firm* — Vorys, Sater, Seymour and Pease LLP; Vincent M DeLuca

(57) ABSTRACT

A technique is described for combining several image sources into a single output image or video sequence. For a given pixel of the output image, pixel values are received from the image sources, and a matrix of distance measures between the pixel values (e.g. based on their colors) is computed. Clusters of pixel values are formed using the distance measures, and a score determined for each. One of the clusters is selected according to the scores, and used to derive an output pixel value. In an example, the clusters are formed using an iterative process where the closest pairs of pixel values or clusters are merged to form new clusters up to a size threshold. Examples are described for scoring the clusters based on model-based weighting or cluster size. Examples are also described for a rule-based cluster selection system. A composite image generator implementing the technique is also described.

18 Claims, 9 Drawing Sheets

| Size of largest cluster | Size of second largest cluster | Size of third largest cluster | Additional conditions | Cluster selection | Output protect flag |
|---|---|---|---|---|---|
| 1 | * | * | | Use the 'safe' pixel. | 1 |
| 2 | 2 | 2 | | Choose either of the first two clusters according to which one is closest to the third. | 1 |
| 3 | 3 | 1 | | Choose either of the first two clusters according to which one is closest to the third. | 0 |
| 3 | 3 | 0 | | Choose the cluster whose members have the lowest total SAD. | 0 |
| 5 | * | * | Largest cluster does not contain the 'safe' pixel. | Use the 'safe' pixel. | 0 |
| 6 | * | * | Largest cluster does not contain the 'safe' pixel. | Use the 'safe' pixel. | 0 |
| N | N | * | N>1 and not one of the above cases. | Choose the cluster that is closest to the 'safe' pixel. | 0 |
| 2 | 2 | 1 | The second largest cluster contains the 'safe' pixel. | Use the 'safe' pixel. | 1 |
| 2 | 2 | 1 | The 'safe' pixel is not in the largest or second largest cluster. The second largest cluster is closest to the safe pixel. | Use the 'safe' pixel. | 1 |
| | | | There are at least two clusters. Cluster sizes are not (2,1,*) or (3,1,*), and the 'safe' pixel was generated using 'mode 2'. | Use the 'safe' pixel. | 0 |

FIGURE 9

PIXEL CLUSTERING

BACKGROUND

Many image or video processing systems perform operations such as rescaling, de-interlacing, or frame-rate conversion, that require the creation of data not present in the source video. Despite their increasing sophistication, the available methods all have limits to their capabilities.

One approach is to use a selection of estimation methods, each of which typically has an area of specialism in which it can be expected to outperform other methods. The task then is to combine the outputs of several different estimation methods in order to create the optimum composite image.

Several approaches to constructing the composite image are currently used. Examples are a median of estimated values, a weighted combination of estimated values, or adaption between estimated values based on the video content. Each approach has problems.

A median of estimated values is simple, and is effective in rejecting outliers in favour of less extreme values. However, it is prone to errors. It is not unusual to find that the correct value is an outlier, particularly when that value is generated by the particular specialism of one estimation method.

When using a weighted combination of estimated values it is difficult to choose an appropriate weighting scheme that is sufficiently robust.

Adaption is often based on motion or edge characteristics and is therefore prone to errors in measurements and in the contributing estimators. It also requires significant tuning of algorithm parameters to achieve good performance. Furthermore, all techniques tend to be closely linked and tuned to the particular estimators being used.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A technique is described for combining several image sources into a single output image or video sequence. For a given pixel of the output image, pixel values are received from the image sources, and a matrix of distance measures between the pixel values (e.g. based on their colours) is computed. Clusters of pixel values are formed using the distance measures, and a score determined for each. One of the clusters is selected according to the scores, and used to derive an output pixel value. In an example, the clusters are formed using an iterative process where the closest pairs of pixel values or clusters are merged to form new clusters up to a size threshold. Examples are described for scoring the clusters based on model-based weighting or cluster size. Examples are also described for a rule-based cluster selection system. A composite image generator implementing the technique is also described.

According to a first aspect there is provided a method of generating a composite image, comprising: for an output pixel of the composite image, receiving a pixel value from each of a plurality of image sources; computing distance measures between the pixel values, such that a distance measure is computed for each combination of pixel value pairs; forming clusters of pixel values according to the computed distance measures; determining a score for each of the clusters; selecting one of the clusters according to the scores; and deriving a value for the output pixel from the selected cluster.

The step of forming clusters of pixel values according to the computed distance measures may further comprise: finding the smallest distance measure; merging the pair of pixel values with the smallest distance measure to form a first cluster; and updating the distance measures to include distance measures between the first cluster and each remaining pixel value.

The step of forming clusters of pixel values according to the computed distance measures may further comprise: creating one cluster from each pixel value; finding the smallest distance measure between clusters; merging the pair of clusters with the smallest distance measure to form a further cluster; and updating the distance measures between the further cluster and each other cluster.

The step of determining the score for each of the clusters may comprise deriving the score from the number of pixel values in the cluster.

The step of selecting a cluster may comprise evaluating a set of rules.

The step of evaluating the set of rules may comprise sorting the clusters into an ordered list according to their scores, and triggering a rule according to the scores of the clusters at at least one predetermined position within the ordered list.

The step of determining a score for each of the clusters may comprise deriving the score from weights assigned to pixel values in the cluster.

The step of deriving the score may comprise summing the weights assigned to the pixel values in the cluster.

The step of selecting one of the clusters according to the scores may comprise selecting a cluster in dependence on the result of one or more comparison tests between the scores.

According to a second aspect of the invention there is provided a composite image generator, comprising: an interface configured to receive a pixel value from each of a plurality of image sources; a distance module configured to compute distance measures between the pixel values; clustering logic configured to form clusters of pixel values according to the computed distance measures; scoring logic configured to determine a score for each cluster; a selection unit configured to select a cluster according to the scores; and an output unit configured to derive a value for an output pixel in a composite image from the selected cluster.

The clustering logic may comprise: a memory configured to store the distance measures computed by the distance circuit; comparison logic configured to find the smallest distance measure; merge logic configured to merge the pair of pixel values with the smallest distance measure to form a first cluster; and an update unit configured to update the distance measures between the first cluster and each remaining pixel value in the memory.

The clustering logic may comprise: a memory configured to store distance measures between clusters; an initialisation unit configured to create one cluster from each pixel value; comparison logic configured to find the smallest distance measure; merge logic configured to merge the pair of clusters with the smallest distance measure to form a further cluster; and an update unit configured to update the distance measures between the further cluster and each other cluster.

The scoring logic may be configured to count the number of pixel values in the cluster.

The selection unit may comprise logic configured to evaluate a set of rules.

The logic configured to evaluate a set of rules may comprise a sorter configured to sort the clusters into an ordered list according to their scores, and triggering logic configured to trigger a rule according to the scores of the clusters at at least one predetermined position within the ordered list.

The scoring logic may be configured to derive the score from weights assigned to pixel values in the cluster.

The scoring logic may be configured to sum the weights assigned to the pixel values in the cluster.

The selection unit may comprise comparison logic configured to select a cluster in dependence on the result of one or more comparison tests between the scores.

The above features may be combined as appropriate, as would be apparent to a skilled person, and may be combined with any of the aspects of the examples.

BRIEF DESCRIPTION OF THE DRAWINGS

Examples will now be described in detail by way of reference to the accompanying drawings in which:

FIG. 9 is a table showing an example set of cluster selection rules;

DETAILED DESCRIPTION

Embodiments will now be described by way of example only. The image or video processing technique described here is a method for combining the outputs from several processors, or estimators, into a single output image or video sequence. The technique addresses several weaknesses in prior art systems and is not dependent on extensive expert tuning. In particular, it is more robust to measurement and picture building errors typical in video processing algorithms and through low resource usage is suitable for real-time, unsupervised applications.

Figure 1:
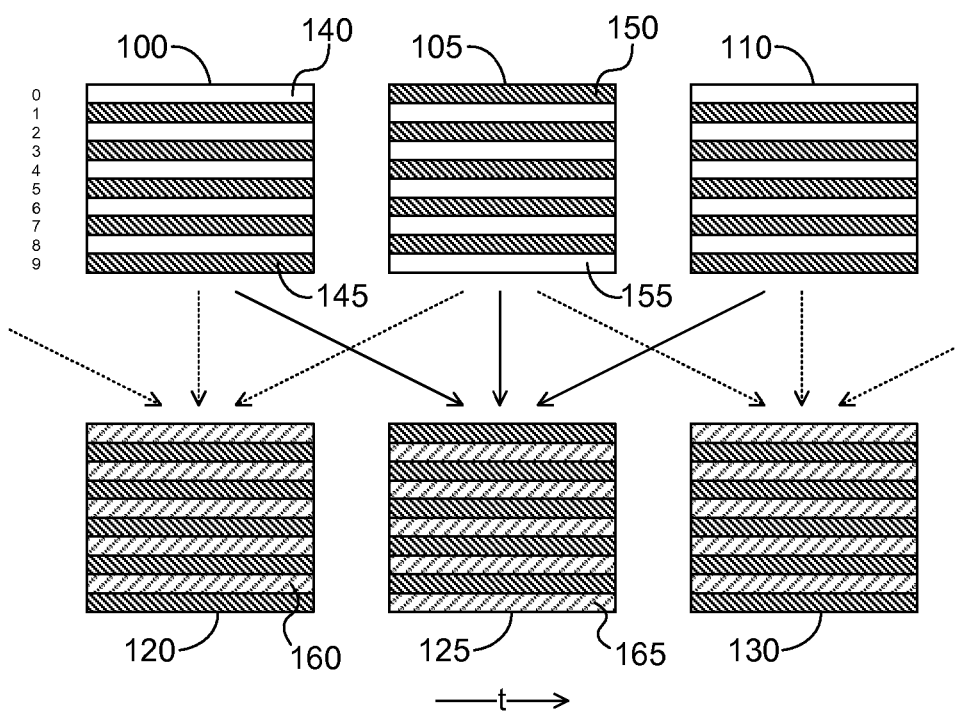
FIG. 1 shows pixel generation in a video de-interlacing system.

FIG. 1 shows a diagram of an example de-interlacing system in which an input sequence of video fields, 100, 105, 110, is processed to produce an output sequence of video frames, 120, 125, 130. In this example alternate fields contain either odd field lines or even field lines. Fields 100 and 110 contain pixel data for odd field lines 145, while pixel data for the even field lines 140, is missing. Field 105 contains pixel data for even field lines 150, while pixel data for the odd field lines 155, is missing. In this example, even line pixel data from a field 105 is combined with pixel data from adjacent fields 100 and 110, and the data is processed to generate pixel data 165 on the odd lines of output frame 125.

Figure 2:
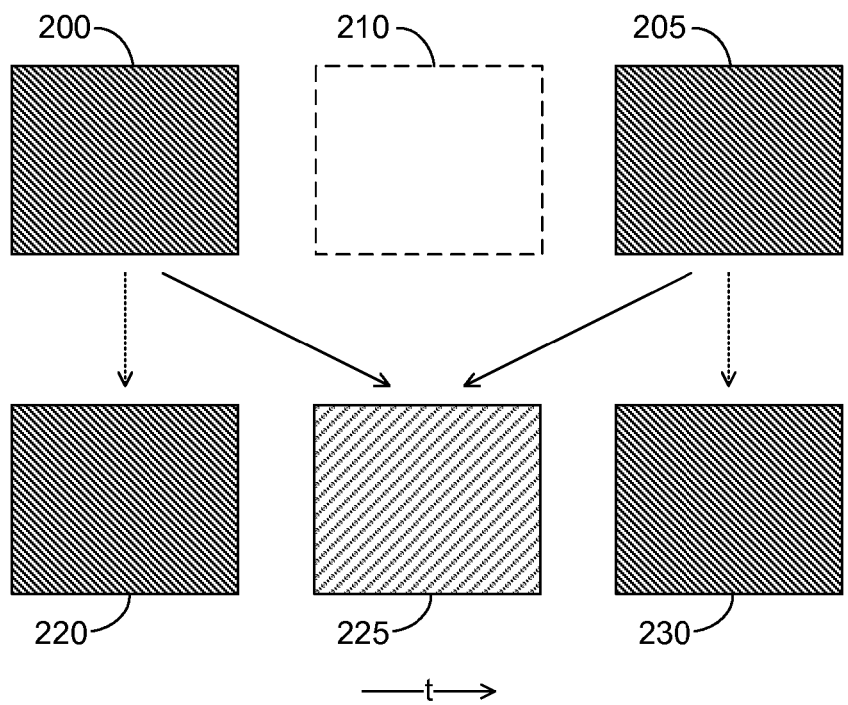
FIG. 2 shows pixel generation in a video frame rate conversion system.

FIG. 2 shows a diagram of an example frame rate converter system in which an input sequence of video frames at a lower frame rate is converted to an output sequence of video frames at a higher frame rate. The input sequence includes frames 200 and 205, but there is no source frame at time 210. In the illustrated case the frame rate is doubled by creating one generated frame between each pair of input frames. Output frames 220 and 230 are copied from the input sequence while output frame 225 is generated by processing pixel data from input frames 200 and 205.

There is significant similarity between the de-interlacer and the frame rate converter, as well as several other processes, such as rescaling, in that each is required to generate pixel data at a position and/or time at which no source pixel data exists.

In the examples of FIGS. 1 and 2, the generated pixel data in field lines 160 and 165, and in frame 225, consists of many estimated pixel values. It is possible for a system to generate pixel data using several different processes, or estimators, such that there are several candidate values for a single pixel position in the output. A frame rate converter typically relies heavily on motion compensation, and may have the option to output a pixel projected from a motion compensated location in a previous input frame, or from a motion compensated location in a future input frame. A non-motion compensated pixel is also often considered. More sophisticated frame rate converters typically use more estimators, and may select an output pixel from a larger number of projections. Motion compensated methods often perform poorly with occluded and revealed areas, so additional estimators projecting data from a frame interval before the occlusion, or after the reveal, have the potential to improve the results.

A de-interlacer, being similar to the frame rate converter, may also use motion compensation, and may therefore use a similar set of estimators. The de-interlacer may also have additional estimators that work spatially, generating missing lines of pixel data from the lines above and below, perhaps with particular consideration given to reconstruction of edges and other image features.

Figure 7:
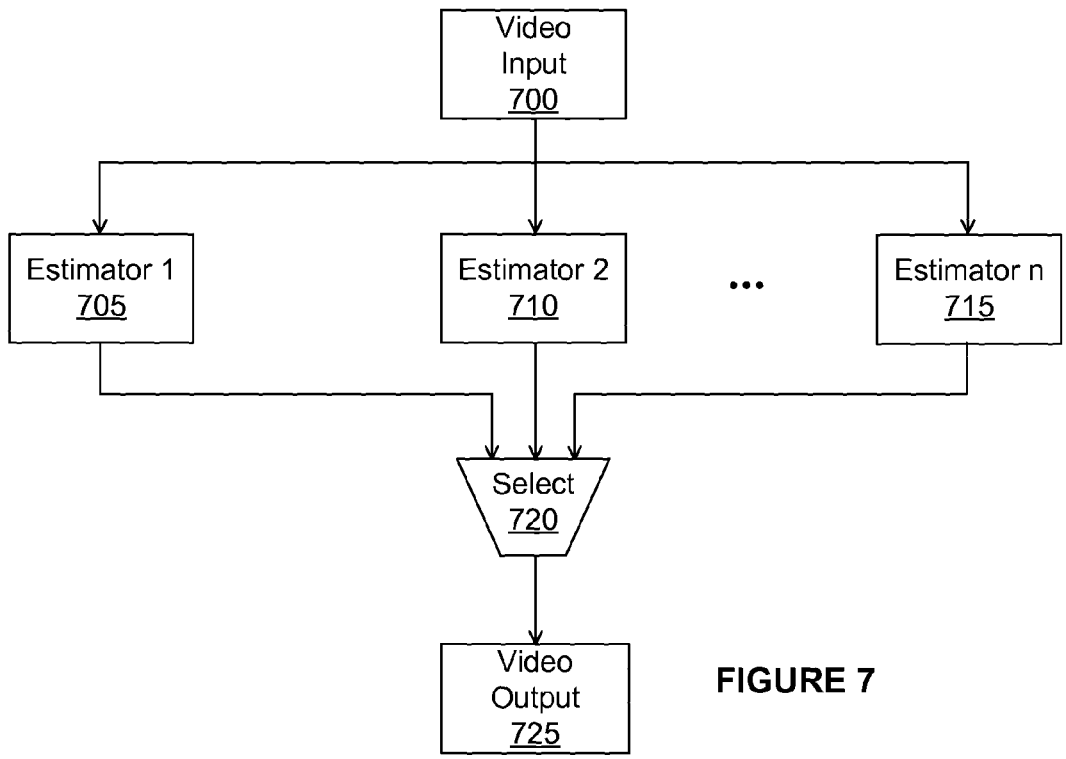
FIG. 7 is a block diagram of a system that combines the outputs from several estimators to form a single output.

The block diagram of FIG. 7 illustrates the common features of each of these systems. A video input, 700, is distributed to each of several estimators, 705, 710, and 715. The estimators produce pixels, from which a selection unit, 720, must select one pixel for output at 725. The selection process is repeated for each pixel in the output frame.

Figure 8:
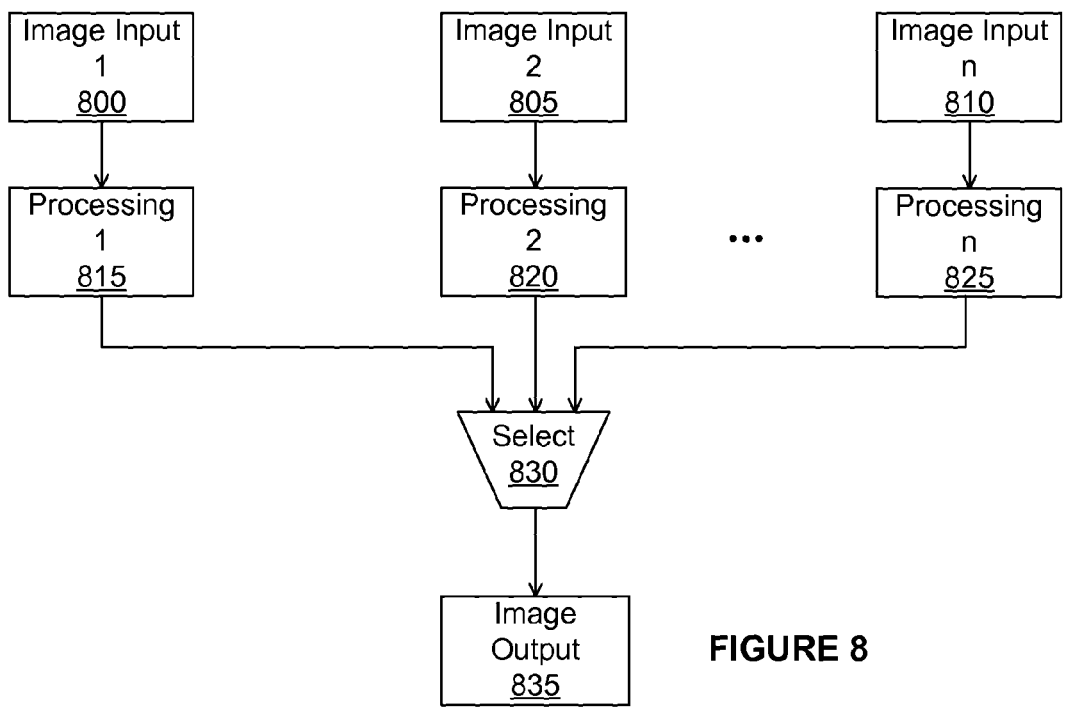
FIG. 8 is a block diagram of a system that combines several images to form a single output image.

Other applications, such as noise reduction, take several inputs and combine them to form a single enhanced output. For example, a camera may make several exposures in succession which are then combined to produce a single low-noise output. FIG. 8 shows such a system. Image data is received at 800, 805, and 810, and optionally may be processed at 815, 820, and 825. The problem of combining the images is similar in that each output pixel must be selected, 830, from one of several sources, and so the technique described here may equally be applied to a system of this type.

In one example system, a median is used to select the output pixel. This works on the assumption that most estimators will produce a suitable candidate pixel. The median serves to reject candidates which are outliers. Commonly, when an additional estimator is added to a system, it is because that estimator has a unique ability to produce the correct result in a particular situation. Methods such as the median, or voting methods, penalise the specialist estimator.

In other systems, a measure of the performance of each estimator is used to influence the selection of output pixel. For example, assignment errors produced by a motion estimator give an indication of how it is performing. In a block matching motion estimator, for example, the assignment error may be derived from the sum of absolute differences (SAD) produced when testing the vector that is eventually used to project pixel data into the output frame. Low assignment errors suggest that the vector is good, and therefore that the projected pixel is reliable, while a high assignment error suggests that the vector is poor, and that the projected pixel is not reliable. Unfortunately, while assignment errors may give a general indication of the performance of a motion estimator, they can be misleading if used to evaluate individual pixel projections. In particular, assignment errors are notoriously unreliable in occluded and revealed areas, or when the image lacks strong features. Other error metrics may be considered, but it is often found that they are not sufficiently reliable.

Example systems will now be described in which estimated pixel values are formed into clusters, where a cluster is a grouping of one or more pixel values. Scores or weights may be determined for the estimated values, and the scores used to determine the reliability of the cluster. A cluster is selected for output, and an output pixel value is derived from the members of that cluster.

Figure 3:
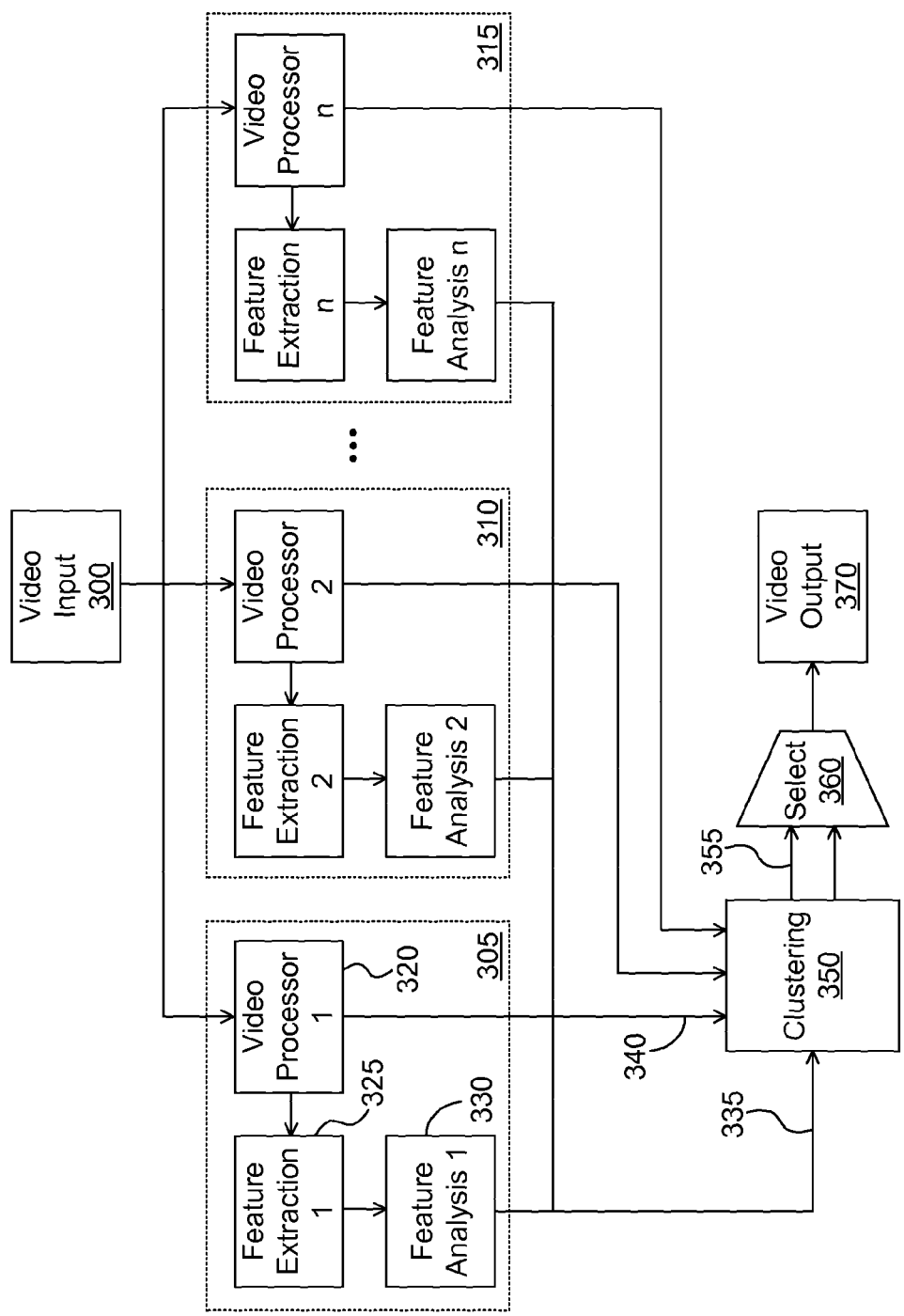
FIG. 3 is a block diagram showing several estimators coupled to a clustering unit.

One example system is illustrated in FIG. 3. A video input 300 is distributed to each of several estimators, 305, 310, 315. Each estimator contains a video processor 320, and may contain feature extraction 325 and feature analysis 330 units. Each video processor sends pixel data 340 to the clustering unit 350. The clustering unit may also accept input 335 from the feature analysis units. The clustering unit outputs clusters 355 to a selection unit 360, where one of the clusters is selected for output 370.

In one example, the clustering unit 350 forms clusters based entirely on the values of the estimated pixels at that position. Pixels with similar values are assigned to the same cluster, and pixels with non-similar values are assigned to different clusters. In a further example, the criteria for similarity are selected such that pixels assigned to the same cluster are perceptually indistinguishable from each other. Pixels that are perceptually indistinguishable from each other are sufficiently similar that a typical viewer would be unlikely to discern a difference if the values were exchanged in an output image.

Pixel values in video systems typically have three components, for example, red, green, and blue values (RGB), or a luminance value (Y) and a pair of chrominance values (U and V). The measure of similarity between a pair of pixel values is typically a distance function over one or more of the components. In one example an L1-norm is computed from only the luminance (Y) component of the pixel values, while in another example the L1-norm is computed from all three components. The L1-norm is the shortest distance between two points when following the lines of a rectangular grid. In another example, an L2-norm is used. The L2-norm is the Euclidean distance, or the length of the shortest direct line between two points. In general, a suitable distance measure may be any function of one or more distance terms, with each distance term being a function of one or more components of the pixel values.

In a further example, the clustering of estimated pixel values at a particular position is based not only on the pixel values at that position, but also on the pixel values in a region close to that position. For example, the distance function for a pair of estimated pixel values at position (x,y) may be a function of the distance functions computed for all estimated pixel value pairs in the range (x−n, y−m) to (x+n, y+m).

Clustering methods, such as k-means, are known in the art. The clustering method chosen is application dependent, and as video processing systems often process high resolution data in real time, low cost methods may be preferred.

In one example, the following simplified method is used to produce a variable number of clusters:
1) Initially, each pixel value is a cluster.
2) Assign a position to each cluster. The position of a cluster may be represented by the value of one of its members, or by a function of the values of all its members.
3) Find the two clusters which are closest to each other according to the chosen distance function.
4) If the distance between the two closest clusters is less than a threshold, merge the clusters and recalculate their positions.
5) Repeat steps 2 to 4 until no further merges occur. At this stage, the number of clusters can be determined.
6) For each pixel value in the initial set, determine the closest cluster, and assign the pixel value to that cluster.

Figure 4:
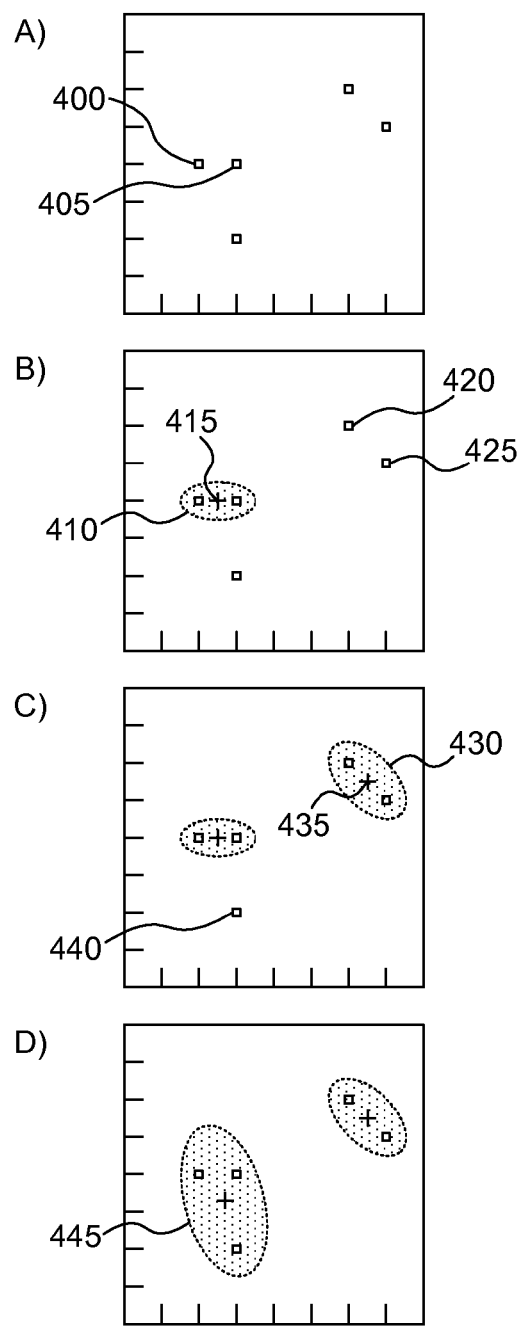
FIG. 4 shows an example clustering method.

FIG. 4 shows the clustering of an example set of pixel values using this method. Each pixel value has two components, shown in a 2D plot. The L1-norm distance is used, and the threshold for merging is a distance of 3. After merging, the position of a cluster is recomputed to be the centroid of the cluster's members.

Initially, the closest pair of pixel values are 400 and 405, with a distance of 1. These are merged to form cluster 410, with centroid at 415. Next, pixel values 420 and 425 are merged to form cluster 430 with centroid at 435. Finally, because the distance from pixel value 440 to the centre of cluster 410 is less than the merging threshold, the pixel value is merged to form cluster 445. The distance between the two clusters is then larger than the merging threshold, so no further merges take place.

Figure 5:
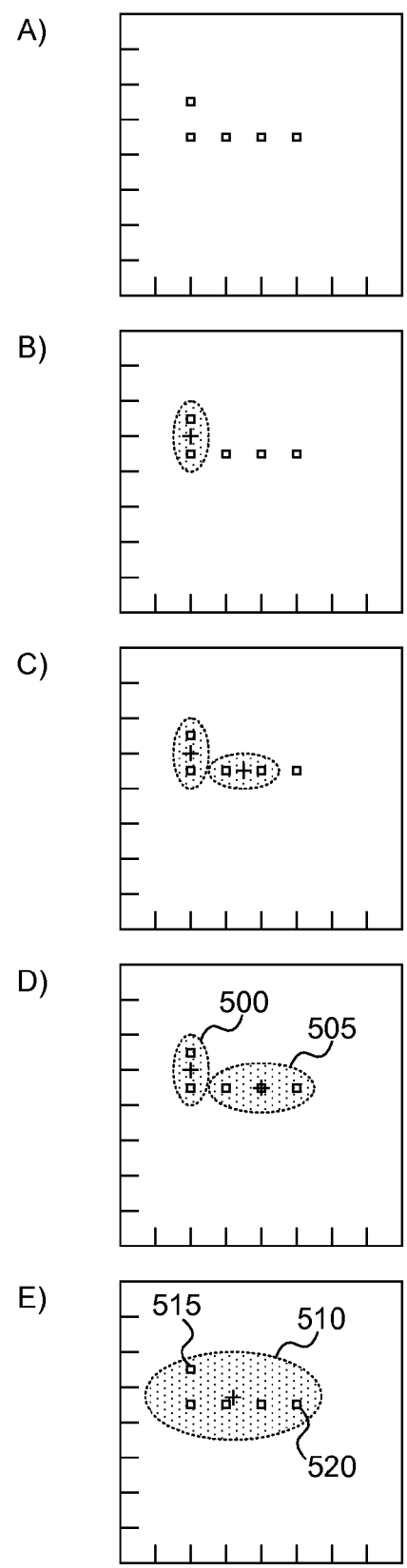
FIG. 5 shows another example of a clustering method.

FIG. 5 shows the clustering of another example set of pixel values. The process is the same as that used in FIG. 4, and it can be seen that this leads to the formation of clusters 500 and 505, in step D. The distance between the centroids of clusters 500 and 505 is 2.5, and so the final step is that the clusters are merged into a single cluster, 510. The greatest distance between members of cluster 510 is 4.0, measured between pixel values 515 and 520. This distance is larger than the merging threshold of 3.0, showing that the merging threshold does not place a strict limit on the cluster size. If, for example, the intention is to form clusters containing pixels that are perceptually indistinguishable it may be found that a method giving greater control over the cluster size is more suitable.

Figure 6:
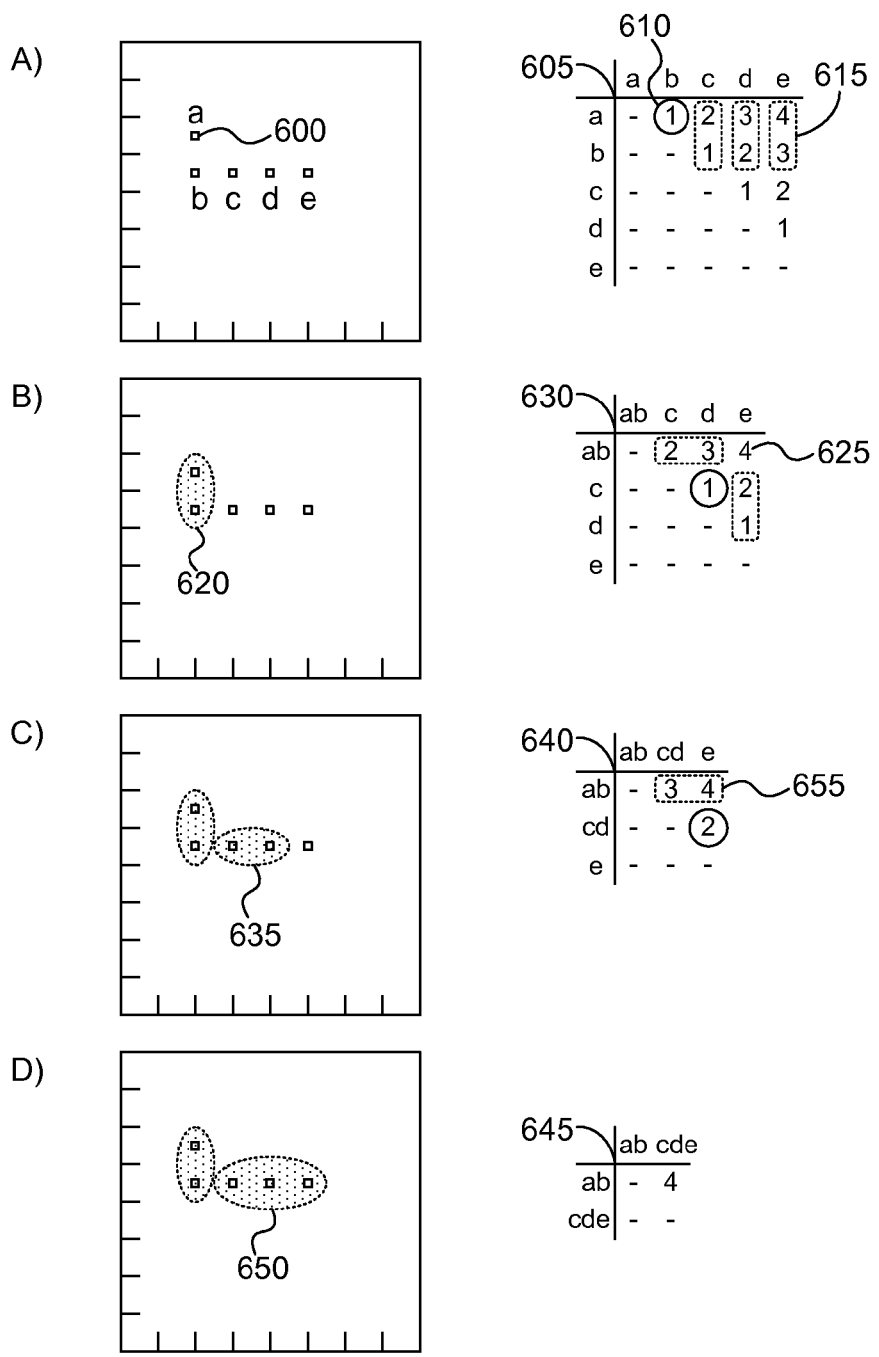
FIG. 6 shows a further clustering method.

FIG. 6 uses the same set of pixel values as in FIG. 5, but shows an alternative clustering method that limits cluster size while also avoiding the computation of cluster centroids.

Pixel values, 600, are identified using letters 'a' to 'e'. Matrix 605 contains distances between each pair of pixels. In this example the L1-norm distance is used, but other distance measures could also be used. The smallest distance, shown circled at 610, is less than the merging threshold so identifies that pixel values 'a' and 'b' should be merged into a cluster, 620, which will be called 'ab'. Dashed boxes in the matrix (such as 615) identify pairs of distances between pixels 'a' or 'b', and any other pixels or clusters. Each distance pair must be reduced to a single distance, between new cluster 'ab' and the corresponding pixel or cluster. This is done by selecting the largest distance of the pair. For example, distance pair 615 contains values 4 and 3. The largest value, 4, is selected and is used to represent the distance, 625, between cluster 'ab' and pixel value 'e' in matrix 630.

In the next step, the smallest distance in matrix 630 is the distance between pixel values 'c' and 'd', which are merged to form a cluster, 635, called 'cd'. Dashed boxes again identify distances to either of the pixel values 'c' or 'd', which are reduced to a single value in new matrix 640, by selecting the largest value of each pair.

In the next step, the smallest distance in matrix 640 is the distance between cluster 'cd' and pixel value 'e'. These are merged to form a new cluster 650, which is called 'cde', and distance pair 655 is reduced to a single value in matrix 645. This matrix now contains no distances which are smaller than the merging threshold, and so the process stops. Notice that the result differs from that produced using the method of FIG. 5 in that no cluster contains pixel values separated by more than the merging threshold distance. The process does not require the computation of cluster centroids and so may have a computational advantage over methods that do.

Figure 10:
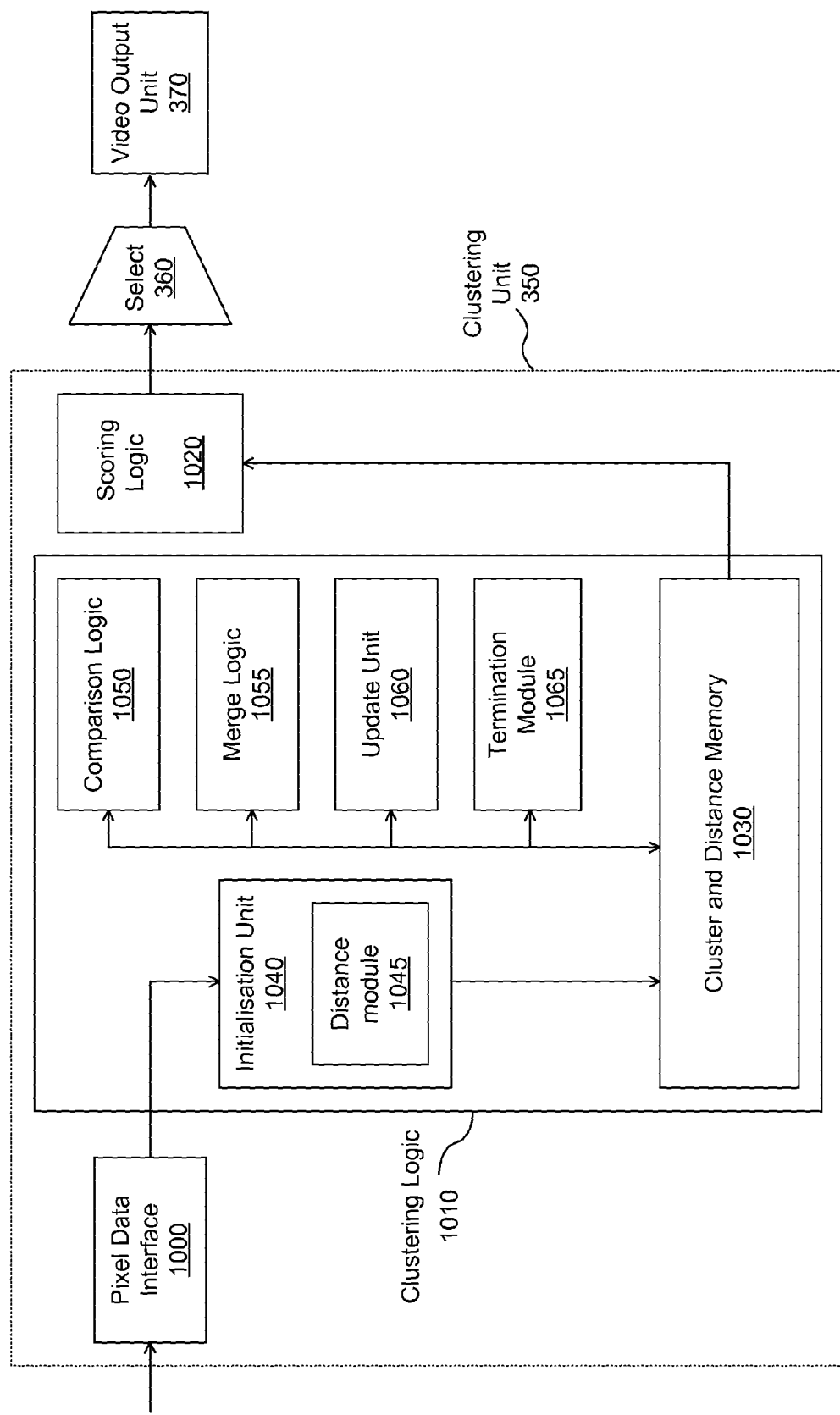
FIG. 10 is a block diagram showing details of one example clustering unit.

FIG. 10 shows the components that comprise clustering unit 350 in one example system. Pixel data is received at an interface 1000, and is passed to clustering logic 1010, where initialisation unit 1040 sets up the contents of memory 1030 using distance module 1045 to calculate the distances between the pairs of pixel values. The data in memory 1030 corresponds to the distance matrices, e.g. 605, of FIG. 6. Clustering logic 1010 also comprises comparison logic 1050, which finds the smallest distance measure in memory 1030, merge logic 1055 which combines a pair of pixel values and/or clusters into a new cluster, and update unit 1060 which stores the new cluster and updates the distances stored in memory 1030. Termination module 1065 determines when the cluster forming process is complete. The clusters are then processed by scoring logic 1020 to determine a score for each. Clusters and their scores are then passed to selection unit 360 which selects one cluster, from which an output pixel value is derived in output unit 370.

In one example, a weighting method is used for scoring. Referring back to FIG. 3, features associated with the estimate are extracted, 325, and analysed, 330, to produce a weight for each pixel.

The features extracted by the feature extraction unit, 325, are application dependent, and may comprise, or be derived from, motion vectors, combing measures, spatial similarity measures, etc., or any combination thereof. The set of features is referred to as the feature vector. Features may relate to only a single pixel, to a spatial or temporal group of pixels, or to a frame or group of frames. For example, a feature may be derived that is based on a group of pixels, and that feature value is subsequently assigned to the pixel value at the centre of the group.

The feature analysis unit, 330, assigns a weight to each pixel based on the response of a model to the feature vector associated with that pixel. Typically the model is derived through an off-line learning process. In one example the model used is a binary classifier, which identifies each estimated pixel value as either 'good' or 'bad'. In another example the weight is a weighted sum over the outputs of a plurality of binary classifiers. This method is known as 'boosting', and may be used to produce a weight value that indicates a level of confidence in the pixel value. Typically a positive weight value indicates a 'good' pixel, and a negative weight value indicates a 'bad' pixel, with the magnitude of the weight indicating the confidence in the classification. Boosting is a member of the class of ensemble classifiers. It will be clear to those skilled in the art that a variety of alternative classifiers may be used, provided that they have similar properties to those described here.

From the weight values produced by each feature analysis unit 330, the clustering unit 350 derives a score for each cluster. In one example the score for a cluster is the sum of the weights of each pixel value in the cluster. The score may also be derived by counting the number of weights that meet a predetermined condition. The particular condition chosen will depend on the nature of the weight values that indicate a 'good' pixel. For example, the score may be a count of the number of weights that are positive, negative, zero, non-zero, or which are greater than or less than a threshold value. In a specific example, the score for a cluster is a count of the number of pixel values in the cluster that have a positive weight. In either case, a large positive score indicates a high confidence in the cluster, while a low, or negative, score indicates a low confidence in the cluster. The selection unit 360 may then select a cluster by means of comparison tests between the scores. For example, the cluster with the highest score may be selected as the cluster from which the output pixel value will be derived.

Figure 11:
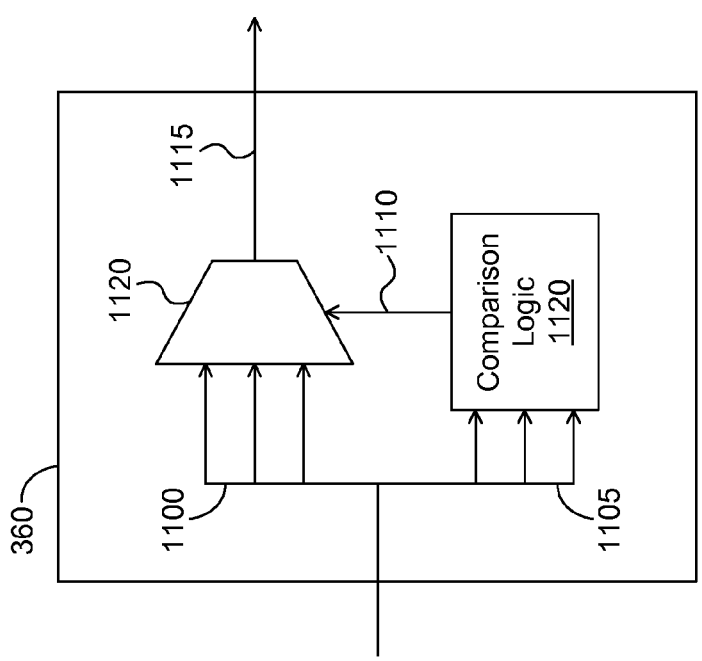
FIG. 11 is a block diagram showing details of one example selection unit.

FIG. 11 shows details of an example selection unit 360 which operates in this way. Incoming cluster data 1100 is directed to switch 1120, while the corresponding scores 1105 are directed to comparison logic 1120. The comparison logic selects a cluster, such as the one with the highest score, and outputs control signal 1110 to switch 1120, such that the selected cluster appears at output 1115.

Cluster selection may also make use of additional data provided by the estimators. For example, a confidence flag may be set to indicate a pixel value in which the estimator has a particularly high level of confidence. In one example, an estimator using an edge-adaptive processing method sets the flag for pixels in the vicinity of a strong edge. Rather than being added to the feature vector and incorporated into the weights of estimated pixels, the flags are used directly to influence cluster selection. In another example, a confidence value is used, where the magnitude of the value represents the degree of confidence.

There may be cases where no clusters can be formed, or where all clusters have a low or negative score. This may be because no estimator has produced a good pixel value, or it may be because the clustering method has failed to identify it. Despite this, it is still necessary to generate a pixel for output. Appropriate methods for doing this are application dependent. In one example the cluster with the largest number of positive weighted members is selected. In another example confidence flags are used to identify pixels that may have been misclassified, and the clustering can be re-evaluated.

In another example a cluster is selected by selection unit 360 by means of the evaluation of a set of rules. The score assigned to each cluster is simply a count of the number of members in the cluster. The default behaviour is then to select the cluster with the highest score, i.e. the largest number of members. The choice of the largest cluster can be seen as an un-weighted voting system, and is also similar to a median, although the largest cluster does not necessarily contain the median pixel. However, as described previously, there are cases where the largest cluster does not give the best output pixel value. The rule set takes advantage of additional information, such as the number of distinct clusters present, and their sizes, to improve the results. Rules based on factors such as these determine when an exception is made, and a cluster other than the largest is selected.

A rule based selection is described using an example from a frame rate converter in which at least seven estimators each produce a projected image. Some estimators do not necessarily project pixels to every location in the projected image, and so the total number of clustered pixel values at a particular location may be less than the number of estimators. The rule set for this illustrative example is shown in FIG. 9.

In this example, one particular estimator is known as the 'safe' estimator. The safe estimator produces a motion compensated pixel at every location which means that a 'safe pixel' is always available for output. Alternative estimators are specialists which, while they have the capability of producing a better result than the safe estimator, they may also be prone to making mistakes. The safe estimator is therefore appropriate for selection in situations of uncertainty. Many of the rules identify cluster arrangements that are characteristic of such situations and therefore indicate the selection of the safe pixel.

To apply the rule set, clusters are sorted into an ordered list according to their scores, and rules are triggered according to the scores of the clusters at at least one predetermined position within the ordered list. In this example clusters are sorted according to the number of pixel values that they contain, and the three largest clusters are considered as each rule is tested in turn. When the sizes of the largest clusters match the conditions specified by a rule, the rule is triggered, and the output cluster is selected according to the rule. When the cluster sizes do not trigger any rule the output pixel value may be derived from a cluster at a predetermined position in the list, such as, in this example, the largest cluster.

For example, using the rule set from FIG. 9, the rule 910 is triggered when the three largest clusters have sizes of 3, 3, and 1 pixel values, or (3,3,1). This rule indicates that the output pixel should be derived from one of the two larger clusters according to which one is closest to the third cluster. In this case the third cluster acts as a tie-breaker.

In other rules, '*' indicates that the size of a cluster does not matter, provided that it is consistent with the sorting by number of members. Rules may also incorporate additional conditions. In FIG. 9, rules 930 and 940 show examples where the largest clusters contain five or six pixels respectively, but do not contain the safe pixel. It may seem that having five or six estimators produce a similar result would be a strong vote for that pixel value. However, the absence of the 'safe' pixel from that cluster is significant, and in this application, it has been found that, usually, this is an indication that all the estimators contributing to the cluster have made a similar mistake.

The rule (N,N,*), 950, describes a general rule that is used to choose between two clusters of identical size. In this example, the 'safe' pixel is used as the tie-breaker.

The rule set may include various rules that are triggered when no clear clusters can be found. This situation may be identified by low numbers of members in the largest clusters, and so can be accommodated in the rule set without requiring special handling. For example, in the rule set shown in FIG. 9, a rule 900 is triggered when the largest cluster contains only one member, and the 'safe' pixel is selected.

In general, the rule based cluster selection uses clustering based on pixel values, and therefore avoids the use of metrics from the estimators. The rule based method may therefore have an advantage over a feature-based weighting method, when those metrics are unreliable. However, it may be found that the metrics do provide some additional useful information, and under certain circumstances there may be benefit from incorporating them into the rule table. In one example, each pixel value has associated with it a SAD value, which is the SAD value of the vector that was determined by a motion estimator and that was used to project that pixel value into its current location. Where a tie-breaker is required, such as when a selection must be made between two clusters of identical size, the SAD values of the pixel values in the cluster may then be used. The cluster with the lowest total SAD may be selected, or, alternatively, the cluster with the lowest minimum SAD, or the cluster with the lowest maximum SAD. In FIG. 9, 920 is a rule that is applied when cluster sizes are (3,3,0). In this case, the SAD values are used as the tie-breaker.

The rule set may also incorporate additional output fields. An output field includes data, such as a flag or value, which is output when that rule is triggered. FIG. 9 shows the example of a 'protect' flag, 960, used to indicate situations which are likely to require post-processing for error concealment, such as when the clusters are small. In one example the protect flag output plane is subject to processing such as erosion, dilation, and smoothing, before being used to apply an error concealment, such as blending, to the output image.

A set of rules such as those in FIG. 9 may be heuristics based on observation. For example, video data may be processed by a frame rate converter modified to output cluster size information at each pixel location, and cluster size patterns may be identified that correspond to areas of the output images in which artifacts are seen. From the cluster size patterns rules may be developed that lead to the selection of more appropriate output pixels in those areas. Alternatively a rule set may be generated automatically, using one of a number of machine learning methods. An automatic approach is particularly appropriate when a ground truth is available, as this makes it possible to evaluate the quality of the estimated pixel values.

Figure 12:
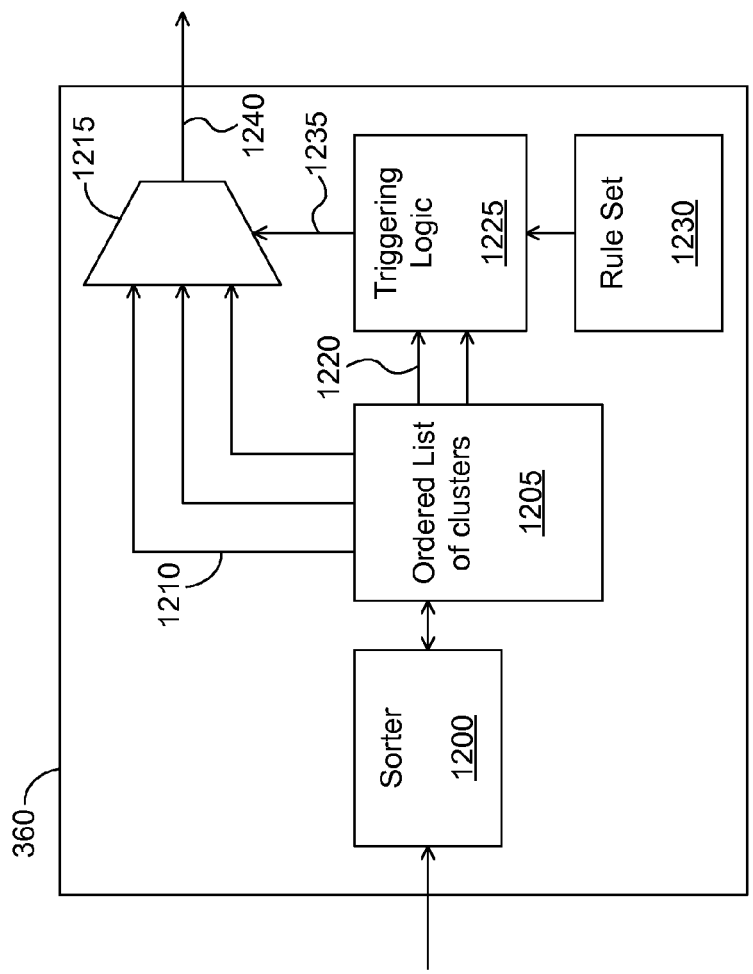
FIG. 12 is a block diagram showing details of another example selection unit.

FIG. 12 shows details of an example selection unit 360 which uses a rule set. Incoming cluster data 1200 is processed by sorter 1200 which sorts the clusters according to their scores to produce ordered list of clusters 1205. The cluster data 1210 is directed to switch 1215, while the scores of clusters at certain predetermined positions within the ordered list 1205 are directed to triggering logic 1225. Triggering logic 1225 applies the rules from rule set 1230 to produce control signal 1235 to switch 1215, such that the selected cluster appears at output 1240.

Having selected a cluster, one pixel value is chosen for output, either by selection unit 360, or by a further downstream block (not shown). Normally the pixels in a cluster are close in value and it is sufficient to simply select any pixel from the cluster. This is particularly true if the chosen clustering method places bounds on the maximum distance between members of the cluster, such that the members are perceptually indistinguishable from each other. Alternatively, a measure of central tendency, such as an average, median, or centroid value may be calculated from the members of the cluster, and that value, or the closest cluster member to that value may be selected for output. Where cluster members have been assigned weights, those weights may also be used to influence the selection of an output pixel. The use of pixel value weights may be particularly appropriate where cluster scores were generally poor and there is a lower level of confidence in the cluster selection. The selected pixel value may be written to a frame buffer for display, or may be sent for further processing.

Generally, any of the functions, methods, techniques or components described above can be implemented in modules using software, firmware, hardware (e.g., fixed logic circuitry), or any combination of these implementations. The terms "module," "functionality," "unit" and "logic" are used herein to generally represent software, firmware, hardware, or any combination thereof.

In the case of a software implementation, the module, functionality, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, unit or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement.

The module, functionality, unit or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, unit or logic described above, such as HDL (hardware description language) software, as is used for designing integrated circuits, or for configuring programmable chips, to carry out desired functions.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of generating a composite image, comprising:
for an output pixel of the composite image, receiving a pixel value from each of a plurality of image sources;
computing distance measures between the received pixel values, such that a distance measure is computed for each combination of pairs of pixel values;
forming clusters of pixel values according to the computed distance measures;
determining a score for each of the clusters;
selecting one of the clusters according to the scores; and
deriving a value for the output pixel from the selected cluster.

2. The method according to claim 1, wherein determining a score for each of the clusters comprises deriving the score from weights assigned to pixel values in the cluster.

3. The method according to claim 2, wherein deriving the score comprises summing the weights assigned to the pixel values in the cluster.

4. The method according to claim 2, wherein deriving the score comprises counting the number of pixel values in the cluster for which the weight satisfies a predefined condition.

5. The method according to claim 1, wherein determining the score for each of the clusters comprises deriving the score from the number of pixel values in the cluster.

6. The method according to claim 1, wherein selecting a cluster comprises evaluating a set of rules.

7. The method according to claim 6, wherein evaluating the set of rules comprises sorting the clusters into an ordered list according to their scores, and triggering a rule according to the scores of the clusters at at least one predetermined position within the ordered list.

8. The method according to claim 7, wherein triggering a rule outputs a flag or value that is used to indicate areas of the output image in which to apply error concealment.

9. The method according to claim 1, wherein forming clusters of pixel values according to the computed distance measures further comprises:
finding the smallest distance measure;
merging the pair of pixel values with the smallest distance measure to form a first cluster; and updating the distance measures to include distance measures between the first cluster and each remaining pixel value.

10. The method according to claim 1, wherein forming clusters of pixel values according to the computed distance measures further comprises:
  creating one cluster from each pixel value;
  finding the smallest distance measure between clusters;
  merging the pair of clusters with the smallest distance measure to form a further cluster; and
  updating the distance measures between the further cluster and each other cluster.

11. A composite image generator, comprising:
  an interface configured to receive a pixel value from each of a plurality of image sources;
  a distance module configured to compute distance measures between the received pixel values;
  clustering logic configured to form clusters of pixel values according to the computed distance measures;
  scoring logic configured to determine a score for each cluster;
  a selection unit configured to select a cluster according to the scores; and
  an output unit configured to derive a value for an output pixel in a composite image form the selected cluster.

12. The composite image generator according to claim 11, wherein the scoring logic is configured to derive the score from weights assigned to pixel values in the cluster.

13. The composite image generator according to claim 12, wherein the scoring logic is configured to sum the weights assigned to the pixel values in the cluster.

14. The composite generator according to claim 12, wherein the scoring logic is configured to count the number of pixel values in the cluster.

15. The composite image generator according to claim 11, wherein the selection unit comprises comparison logic configured to select a cluster in dependence on the result of one or more comparison tests between the scores.

16. The composite image generator according to claim 11, wherein the clustering logic comprises:
  a memory configured to store the distance measures computed by the distance circuit;
  comparison logic configured to find the smallest distance measure;
  merge logic configured to merge the pair of pixel values with the smallest distance measure to form a first cluster; and
  an update unit configured to update the distance measures between the first cluster and each remaining pixel value in the memory.

17. The composite image generator according to claim 11, wherein the clustering logic comprises:
  a memory configured to store distance measures between clusters;
  an initialization unit configured to create one cluster from each pixel value;
  comparison logic configured to find the smallest distance measure;
  merge logic configured to merge the pair of clusters with the smallest distance measure to form a further cluster; and
  an update unit configured to update the distance measures between the further cluster and each other cluster.

18. The composite image generator according to claim 11, wherein the clustering logic is configured to determine a perceptual difference between pixel values, and to assign a pixel value to a cluster only when the pixel value is perceptually indistinguishable from other pixel values in the cluster.

* * * * *